United States Patent
Domba

[15] 3,692,747
[45] Sept. 19, 1972

[54] CHROMIUM COMPLEXES OF MALEIC ANHYDRIDE COPOLYMERS

[72] Inventor: Elemer Domba, Olympia Fields, Ill. 60461

[73] Assignee: Nalco Chemical Company, Chicago, Ill.

[22] Filed: June 9, 1971

[21] Appl. No.: 151,541

[52] U.S. Cl. ............260/78.5 T, 8/94.1 R, 8/94.18
[51] Int. Cl. .................................C08f 27/04
[58] Field of Search ....................260/78.5 T

[56] References Cited

UNITED STATES PATENTS 2,662,835   12/1953   Reid ....................117/121

OTHER PUBLICATIONS

Lagally & Argyle, Steam Cure of Siloxane Coated Glass Containers, I & EC Product Research and Development, pp. 230–236, Vol. 5, No. 3, September 1966.

Primary Examiner—Joseph L. Schofer
Assistant Examiner—John Kight, III
Attorney—John G. Premo et al.

[57] ABSTRACT

This invention relates to new copolymeric compositions having the reoccurring structural formula:

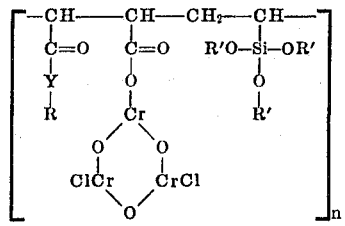

In the above formula R is a $C_{12}$ to $C_{22}$ aliphatic group, R' is a $C_2$ to $C_6$ aliphatic group, n represents an integer and Y is either O or $NH_2$.

These polymers are useful in treating a variety of surfaces, and in particular sheep skin, to impart thereto a high degree of water repellancy.

2 Claims, No Drawings

CHROMIUM COMPLEXES OF MALEIC ANHYDRIDE COPOLYMERS

INTRODUCTION

Many polymeric compositions have been disclosed for rendering a variety of surfaces water repellent. For instance, various silicon polymers and fluorinated hydrocarbon polymers have been described and used for such purposes. A particularly difficult problem in the area of rendering surfaces water repellant is the treatment of various leather products, and specifically sheep skin to render them water repellent. The present invention contemplates using a new class of polymeric materials for treating sheep skin to render it water repellant.

THE INVENTION

In accordance with the invention there is provided new polymeric compositions having the formula:

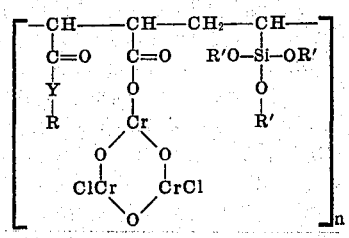

In the above formula R is an aliphatic radical of from 12 to 22 carbon atoms. It is preferably an aliphatic hydrocarbon radical of 16 to 18 carbon atoms in chain length. R preferably represents the oleyl radical.

R' is a lower aliphatic radical of from two to six carbon atoms in chain length. It is preferably an ethyl radical. Y is O or $NH_2$. n is an integer which preferably has a value greater than 10.

THE STARTING COPOLYMERS

The base copolymers from which the copolymers of the invention are derived are formed by the reaction of maleic anhydride and vinyl silane esters. These copolymers are well known and are described in detail with respect to their structure and method of synthesis in the article appearing in Vol. 5, No. 3 of the September, 1966 issue of I&EC PRODUCT RESEARCH AND DEVELOPMENT, pages 230–236, entitled "Steam Cure of Siloxane-Coated Glass Containers" by Paul Lagally and Priscilla Argyle. The disclosure of this article is incorporated herein by reference. As pointed out by the authors, maleic anhydride when reacted with vinyl silane esters form copolymers which contain alternate maleic anhydride units and silane ester units. The starting vinyl silane esters may be selected from several commercially available materials although the vinyl ethyl silane ester is most suited in the practice of this invention.

PREPARATION OF THE STARTING COPOLYMER

While the preparative techniques described in the Lagally and Argyle article previously referred to may be used, it has been found that the maleic anhydride vinyl silane ester copolymers may be prepared by merely heating the two starting reactants in a hydrocarbon solvent for from 3 to 8 hours under conditions of reflux. A preferred solvent for preparing the starting copolymers are the aromatic hydrocarbon solvents benzene, xylene or toluene. Benzene is a preferred solvent. The temperature of the polymerization may typically be in the range of 50°–160°C.

In a typical polymerization, benzene is placed in a reaction flask to which equimolar portions of the vinyl silane ester and maleic anhydride are added. A small amount of a free radical catalyst such as an organic peroxide, e.g., benzyl peroxide is added. The reactants are then refluxed from 6 to 10 hours at which time the copolymer is formed as a benzene solution thereof.

MODIFICATION OF THE COPOLYMERS

It will be noted from the structural formula of the copolymers of the invention that the maleic anhydride portion of the molecule is reacted so that one-half of the carboxylic acid groups are converted into esters or amides, with the remaining carboxylic acid groups being converted into chromium chloride complexes.

To a benzene polymer solution prepared as described above, there is first added an appropriate aliphatic alcohol or amine such as oleyl alcohol or stearyl amine. The reaction mixture thus formed is heated at about reflux conditions for from 1 to 4 hours and preferably about 2 hours, at the end of which time the ester or amide grouping is placed on one-half of the carboxylic acid groups formed from the hydrolysis of the maleic anhydride. Upon completion of this reaction the inorganic solvent is removed by distillation, leaving a residue of powdery modified copolymer.

CONVERSION OF THE REMAINING CARBOXYLIC ACID GROUP INTO THE CHROMIUM CHLORIDE COMPLEX

The isolated polymer described above is then treated to prepare the chromium chloride complex of the remaining carboxylic acid groups of the copolymer. This preparation is conveniently accomplished by using the techniques set forth in U.S. Pat. No. 2,662,835. The disclosure of which patent is incorporated herein by reference.

Using the specific technique as set forth in Example 1 of this patent, the maleic anhydride vinyl silane ethyl ester copolymer, which is partially esterified with oleyl alcohol is reacted with chromyl chloride. Upon solvent removal the finished polymer may be dissolved in isopropanol or other water miscible lower aliphatic alcohol to make a 5 – 15 percent by weight solution. These particular solutions are ideally suited as a concentrate useful in treating sheep skins to render them water repellent.

WATER REPELLANT TREATMENT

A 10 percent isopropanol solution as prepared above may be diluted with water to prepare a ½ percent by weight polymer solution. This solution is then used as a dip bath for treating partially processed sheep skins. The sheep skin is immersed in this solution for 2 hours by means of a rotating drum. At the end of this time the skins are dried and further processed conventionally. The treated skins have excellent water repellant properties and a superior hand. When the polymers are added to water the silane ester groupings hydrolize to form silanol groupings which interreact to form polysiloxanes. This inter-polymerization is believed to account for the improved water repellant effects achieved by the use of these polymers.

In addition to rendering sheep skins water repellent, other surfaces such as cloth, masonry, pig skins, and the like also may be rendered water repellant.

I claim:

1. A novel copolymer exhibiting water repellant properties having the formula:

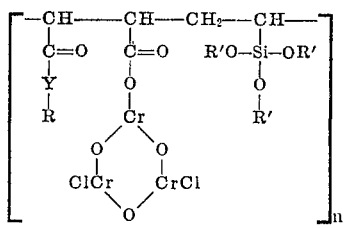

where R is a $C_{12}$ to $C_{22}$ aliphatic group, R' is a $C_2$ to $C_6$ aliphatic group, $n$ represents an integer and Y is either O or $NH_2$.

2. The copolymer of claim 1 where R is oleyl, R' is ethyl and Y is O.

* * * * *